US012118570B2

(12) United States Patent
Apfelbaum et al.

(10) Patent No.: US 12,118,570 B2
(45) Date of Patent: Oct. 15, 2024

(54) PROSPECTIVE CLIENT INTAKE AND ASSIGNMENT SYSTEM

(71) Applicant: Morgan & Morgan PA, Orlando, FL (US)

(72) Inventors: Yehuda Apfelbaum, New York, NY (US); Koichi Hirano, Red Hook, NY (US)

(73) Assignee: MORGAN & MORGAN PA, Orlando, FL (US)

( * ) Notice: Subject to any disclaimer, the term of this patent is extended or adjusted under 35 U.S.C. 154(b) by 590 days.

(21) Appl. No.: 17/304,045

(22) Filed: Jun. 14, 2021

(65) Prior Publication Data

US 2022/0012749 A1    Jan. 13, 2022

Related U.S. Application Data

(60) Provisional application No. 62/705,614, filed on Jul. 7, 2020.

(51) Int. Cl.
*G06Q 30/018*    (2023.01)
*G06F 40/205*    (2020.01)
(Continued)

(52) U.S. Cl.
CPC ......... *G06Q 30/018* (2013.01); *G06F 40/205* (2020.01); *G06N 3/006* (2013.01);
(Continued)

(58) Field of Classification Search
CPC .... G06Q 30/018; G06Q 30/016; G06Q 50/18; G06Q 20/127; G06N 20/00; G06N 3/006; G06N 5/04; G06F 40/205
(Continued)

(56) References Cited

U.S. PATENT DOCUMENTS

2015/0371170 A1* 12/2015 Magrath ................ G06Q 10/10
                                                    705/7.39
2018/0357221 A1* 12/2018 Galitsky ............... G06F 40/289
(Continued)

OTHER PUBLICATIONS

R. Sil, A. Roy, B. Bhushan and A. K. Mazumdar, "Artificial Intelligence and Machine Learning based Legal Application: The State-of-the-Art and Future Research Trends," 2019 International Conference on Computing, Communication, and Intelligent Systems (ICCCIS), Greater Noida, India, 2019, pp. 57-62, (Year: 2019).*

(Continued)

*Primary Examiner* — Wenren Chen
(74) *Attorney, Agent, or Firm* — Ascenda Law Group, PC

(57) ABSTRACT

Methods and systems for automatically interviewing and evaluating prospective clients for engagement by a law firm. Through a virtual agent interface a prospective client is engaged in conversation to elicit information useful in determining whether the prospective client is suitable for an engagement. Information obtained from the prospective client is evaluated to identify likely causes of action, which are scored and assessed against engagement criteria. If the scoring and assessment reveal that the prospective client's likely cause of action is suitable for engagement, an engagement process is initiated, otherwise, the interview continues in an attempt to identify other potential causes of action and/or additional facts for reassessing the initially identified potential cause of action. If one or more potential causes of action score sufficiently high enough to warrant engagement, an engagement process is initiated, otherwise a non-engagement procedure with the prospective client is performed.

3 Claims, 5 Drawing Sheets

(51) Int. Cl.
*G06N 3/006* (2023.01)
*G06N 5/04* (2023.01)
*G06N 20/00* (2019.01)
*G06Q 20/12* (2012.01)
*G06Q 30/016* (2023.01)
*G06Q 50/18* (2012.01)

(52) U.S. Cl.
CPC ............... *G06N 5/04* (2013.01); *G06N 20/00* (2019.01); *G06Q 30/016* (2013.01); *G06Q 50/18* (2013.01); *G06Q 20/127* (2013.01)

(58) Field of Classification Search
USPC .......................................................... 705/317
See application file for complete search history.

(56) References Cited

U.S. PATENT DOCUMENTS

| | | | |
|---|---|---|---|
| 2019/0180195 A1* | 6/2019 | Terry | G06F 40/295 |
| 2019/0385256 A1* | 12/2019 | Nahamoo | G06Q 50/18 |
| 2021/0192412 A1* | 6/2021 | Krishnaswamy | G06Q 10/06375 |

OTHER PUBLICATIONS

S. Debnath, S. Sen and B. Blackstock, "LawBot: a multiagent assistant for legal research," in IEEE Internet Computing, vol. 4, No. 6, pp. 32-37, Nov.-Dec. 2000, doi: 10.1109/4236.895013. (Year: 2000).*

* cited by examiner

PROSPECTIVE CLIENT INTAKE AND ASSIGNMENT SYSTEM

RELATED APPLICATIONS

This is a NONPROVISIONAL of, claims priority to, and incorporates by reference U.S. Provisional Application No. 62/705,614, filed Jul. 7, 2020.

FIELD OF THE INVENTION

The present invention relates to systems and methods for automatically interviewing and evaluating prospective clients for engagement in connection with causes of action revealed through the interview process.

BACKGROUND

Automated conversational interfaces are a growing trend in many forms of business and consumer interaction. For example, many retail establishments and consumer service enterprises employ such interfaces as components of a web site or other online portal for interaction with potential and/or existing customers. Often, these interfaces are referred to as chatbots or virtual agents. The chatbots/virtual agents are generally configured to engage consumers in simulated conversations for purposes of information delivery or problem resolution.

A well-constructed chatbot/virtual agent often appears to engage human users in seemingly intelligent discussions. Of course, the chatbot/virtual agent is really just the user-exposed portion—the user interface—of a larger computer system. These computer systems typically employ problem-solving techniques in order to engage the human user(s) via the chatbot/virtual agent interface to solicit information and provide responses.

Broadly speaking, two forms of problem-solving techniques are employed by computer systems backing chatbot/virtual agent interfaces. The first is a rule-based approach in which scripted actions are performed whenever specified conditional tests for the associated action(s) are satisfied. Stated differently, rule-based approaches examine inputs against explicit criteria and, when the criteria are satisfied, execute associated, pre-defined actions. The criteria (the "rules") may be examined in a prescribed order or hierarchy (e.g., in order to emulate business protocols or other desired approaches) and execution of a higher-ranked rule may preclude (or demand) execution of lower-ranked rules. Alternatively, rules may be evaluated in parallel with one another and actions associated with one or more rules satisfied by an input may be undertaken. Rule-based systems are typically characterized by if-then-else statements that define the criteria being evaluated and the actions to be taken when the value of a parameter under evaluation satisfies the evaluation criteria.

The second problem-solving technique involves case-based approaches, in which chatbot outputs for current inputs are developed through analogies to earlier solutions for related, but somewhat different, situations. This approach can be analogized to the common law notion of precedent, which uses outcomes or holdings of prior judicial decisions as a basis for justifying those of later ones by reason of similarities or equivalencies in facts, circumstances, or other conditions. In terms of a computer process, a case-based approach involves retrieving relevant "cases" (e.g., problem-solution or, more broadly, input-output pairs), mapping prior solutions from the retrieved cases to a current problem and adapting those solutions to fit the changed circumstances or conditions of the current problem, and (optionally, but often) retaining the new problem-solution pair as a new "case." A common implementation of case-based reasoning of this kind is pattern matching, in which components of a new input (e.g., key words in a sentence) are identified and a stored response pattern is adjusted to unique parameters of the new input. One well-known chatbot developed by The Personality Forge, Ltd. Co. incorporates natural language processing along with case-based reasoning to parse and understand natural language input sentences and then provide that information to a case-based reasoning (CBR) engine. The CBR engine responds based on a stored library of previous chat sessions and other information.

SUMMARY OF THE INVENTION

In some embodiments, the present invention provides a system having a virtual agent interface communicatively coupled to predictive case engine for automatically interviewing and evaluating prospective clients for engagement with a law firm. In some instances, the virtual agent interface may interact with the predictive case engine through a chat runtime agent running on a server, which executes the predictive case engine as appropriate. The virtual agent interface is configured as a front end for the predictive case engine to engage prospective clients of the law firm in a conversation to elicit facts concerning potential causes of action. The predictive case engine is configured to evaluate those facts for assessing engagement of the prospective clients by the law firm using scorings assigned according to stored information concerning prior judicial decisions and settlements. The virtual agent interface may be instantiated at a server and accessible by the prospective clients though a web site or other portal associated with the law firm. Alternatively, the virtual agent interface may be a component of a case management platform offered on a subscription basis. In either instance, the virtual agent interface may be configured to accept natural language inputs from the prospective client. For example, the virtual agent interface may include a natural language processor configured to parse input messages and extract key words and/or strings.

The predictive case engine may include a case matching module configured to identify the potential causes of action from the key words and/or strings extracted from the input messages received via the virtual agent interface. Additionally, the predictive case engine may include one or more machine learning modules configured to train the case matching module to identify factual distinctions associated with the potential causes of action that affect outcomes in judicial decisions and settlements and to engage the prospective clients with specific questions when potential causes of action are recognized from the key words and/or strings included in the prospective clients' input messages. For example, at least one of the machine learning modules may comprise a convolutional neural network configured to generate case fact pattern vector representations from prior case information stored in one or more databases accessible by the predictive case engine by pooling results of convolution operations on n-dimension vectors that represent extracted facts from individual cases included in the prior case information. The case matching module may then be configured to engage the prospective clients with specific questions by populating a dialog module of the predictive case engine with interrogatories to be presented to the prospective clients through the virtual agent interface.

An identified likely one of the potential causes of action may be scored by a case scoring module of the predictive case engine by evaluating a description provided by one of the prospective clients through the conversation with the virtual agent system against stored case information in one or more databases accessible by the predictive case engine. The stored case information may include available verdict and settlement information from prior cases.

In further embodiments, the present invention provides a process for automatically interviewing and evaluating prospective clients for engagement by a law firm. That process includes monitoring a virtual agent interface for new conversations, and, when a new conversation is detected, engaging a prospective client in conversation via the virtual agent interface to elicit information useful in determining whether the prospective client is suitable for an engagement. The information obtained from the prospective client is evaluated to determine if a likely cause of action can be identified, and when a likely cause of action is identified based on the information provided by the prospective client, scoring and assessing the identified cause of action against engagement criteria for causes of action of that kind. If the scoring and assessment reveal that the prospective client's likely cause of action is suitable for engagement, an engagement process is initiated, otherwise, the prospective client may be further engaged in conversation via the virtual client interface to obtain additional information that may reveal other potential causes of action and/or additional facts pertaining to the initially identified potential cause of action. As new information is elicited, potential new causes of action are identified, scored, and assessed and previously identified causes of action may be reevaluated using the additional information. The interviewing and assessment continues until one or more potential causes of action score sufficiently high enough to warrant engagement, or the conversation with the prospective client exhausts the available facts without revealing a potential cause of action with a score sufficiently high enough to warrant engagement, in which instance a non-engagement procedure with the prospective client is performed. As indicated above, the cause of action assessment may be performed using information stored in a knowledge database and the cause of action assessment may include evaluating the information obtained from the prospective client against fact patterns and outcomes culled from previously contested cases, both reported and unreported.

There and further embodiments of the invention are described in detail below, with reference to the accompanying drawings.

BRIEF DESCRIPTION OF THE DRAWINGS

The present invention is illustrated by way of example, and not limitation, in the figures of the accompanying drawings, in which.

DESCRIPTION

Described herein are systems and methods for automatically interviewing and evaluating prospective clients for engagement in connection with causes of action revealed through the interview process. In one instance, a system configured in accordance with the present invention provides a self-signup facility for prospective clients of a law firm to engage in a conversation with a chatbot/virtual agent interface configured as a front end for a predictive case engine configured to evaluate the prospective clients for engagement with/by the law firm. The chatbot/virtual agent interface and predictive case engine may be instantiated at a server, with the chatbot/virtual agent interface accessible by prospective clients though a web site or other portal associated with the law firm. In some instances, the system may be a component of a larger case management platform and offered on a subscription or other basis as a lead generation tool to one or more law firms.

Figure 1:
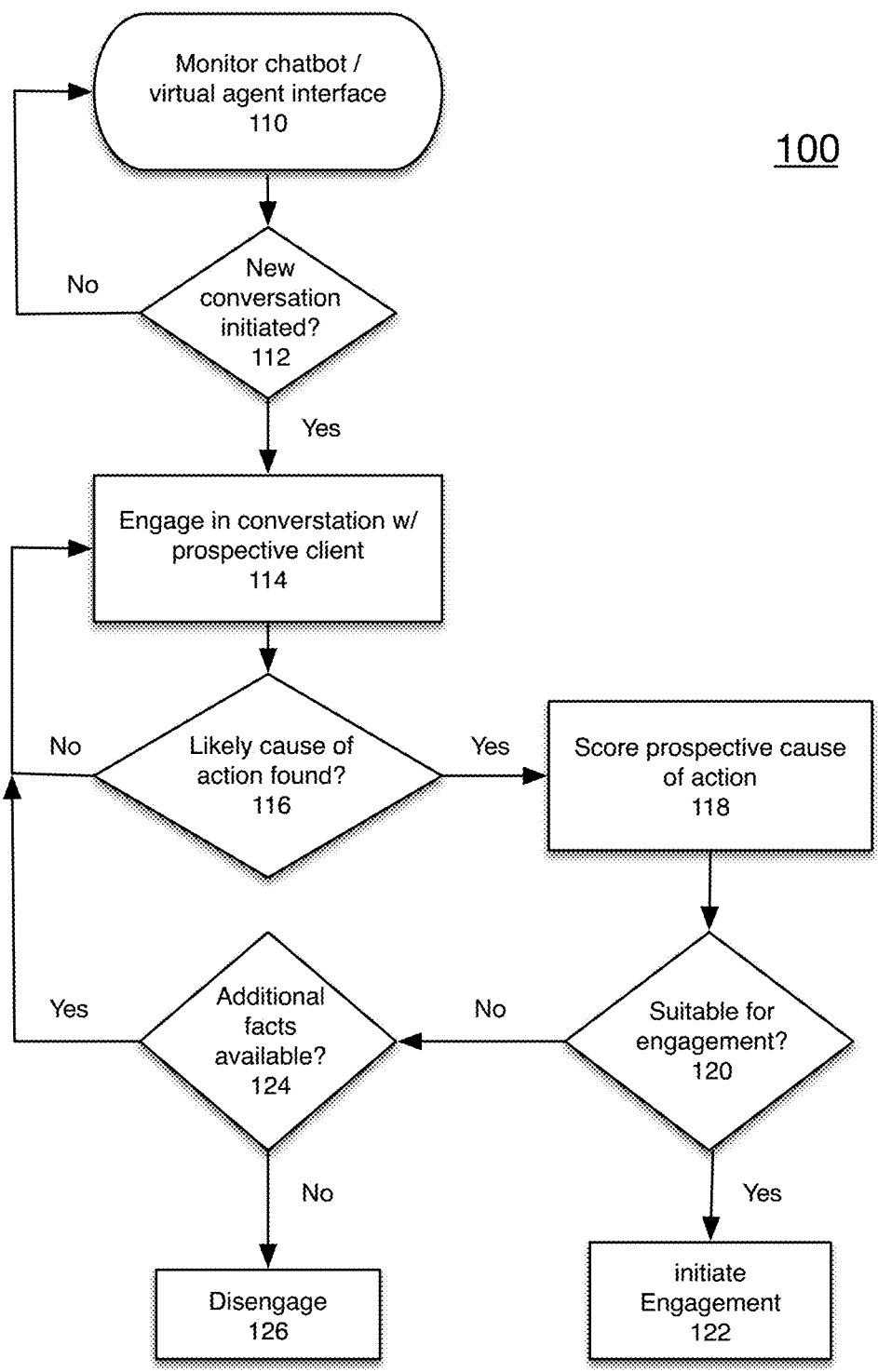
FIG. 1 illustrates an example of a process by which systems configured in accordance with some embodiments of the present invention automatically interview and evaluate prospective clients for engagement with/by a law firm.

Referring first to FIG. 1, an overview of a process 100 by which systems configured in accordance with some embodiments of the present invention automatically interview and evaluate prospective clients for engagement is presented. At step 110, the chatbot/virtual agent interface is monitored for new conversations. When a new conversation is detected 112, the system engages the prospective client in conversation 114 to elicit information useful in determining whether the prospective client is suitable for an engagement. The conversation proceeds, during which time the system evaluates the information obtained from the prospective client to determine if a likely cause of action can be identified 116.

When a likely cause of action is identified based on the information provided by the prospective client, it is scored 118 and assessed 120 against engagement criteria for causes of action of that kind. If the scoring and assessment reveal that the prospective client's likely cause of action is suitable for engagement, the engagement process is initiated 122. Otherwise, the system continues to engage the prospective client in conversation 124 to obtain additional information that may reveal other potential causes of action and/or additional facts pertaining to the initially identified potential cause of action. As this new information is elicited, the system identifies, scores, and assesses the potential new causes of action and also, optionally, reevaluates previously identified causes of action using the new facts through the process described above. The interview process continues until one or more potential causes of action score sufficiently high enough to warrant engagement 122, or the conversation with the prospective client has exhausted the available facts without revealing a potential cause of action with a score sufficiently high enough to warrant engagement. In this latter instance, a disengagement procedure is performed 126.

As will be further described below, the cause of action evaluation assesses data uncovered through a conversation with the prospective client with information stored in a knowledge database. This step involves appraising the data from the prospective client against fact patterns and outcomes culled from a large number of previously contested cases, both reported and unreported. If the data necessary to make a sufficient evaluation is not yet available, then the system engages the prospective client in further conversation to retrieve the data necessary to complete the evaluation. The result of each evaluation is affected by confidence levels in outcomes as revealed by the cases, questions, and prospective client's responses. If the confidence level or score of a certain outcome or outcomes associated with one or more prospective causes of action rises above a predetermined threshold for an associated cause of action (or multiple causes of action), then that cause of action (or the causes of action) is (are) deemed an engageable prospect (step 122). If no prospective causes of action rise above the associated thresholds, then the system directs disengagement with the prospective client.

To engage the prospective client(s) in conversation as part of the above-described process, a chatbot/virtual agent is deployed. The chatbot/virtual agent may be integrated with digital platforms (e.g., websites and/or client evaluation/intake portals) of a law firm or referral agency. As used herein, the terms "chatbot" and "virtual agent" are meant to be interchangeable and hereafter the single term virtual agent will be used in connection therewith.

Figure 2:
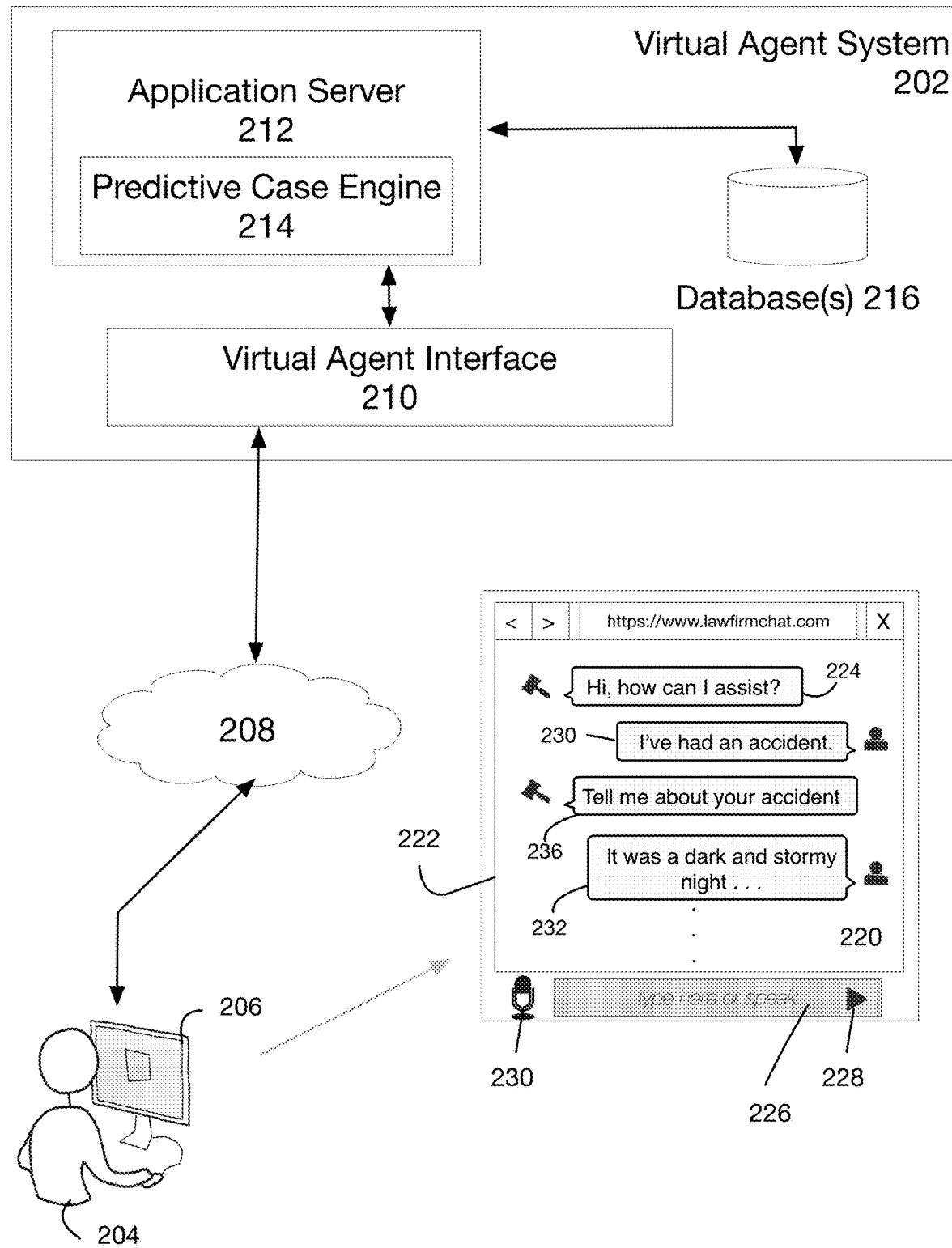
FIG. 2 illustrates aspects of a virtual agent system configured with a predictive case engine in accordance with embodiments of the present invention.

Referring now to FIG. 2, a user 204 at a client station 206 accesses the virtual agent system 202 over a network or network of networks 208. In general, client station 206 may be a personal computer or similar device running a web browser or a mobile, processor-based device such as a tablet device, a personal digital assistant, a smart phone, a laptop or notebook computer, etc., running a web browser or other communication application. More generally, user 204 represents a prospective client using client station 206 to visit a web site or other portal over the Internet 208 and engaging in a virtual communication session with the virtual agent system 202 via the virtual agent interface 210.

The virtual agent system 202 includes, in this illustrated embodiment, an application server 212, which is configured, at least in part, as a predictive case engine 214. The predictive case engine 214 is communicatively coupled to the virtual agent interface 210 and to one or more databases 216. Although the databases 216 are shown in this example as being part of the virtual agent system 202, in other instances some or all of the databases 216 may be associated with other systems, for example systems that store records of prior lawsuits, case management records, judicial decisions and orders, etc. In some instances, the virtual agent interface may interact with the predictive case engine through a chat runtime agent running on the server, which executes the predictive case engine as appropriate.

The virtual agent interface 210 provides a conversation (or "chat") interface 220 at the client terminal 206, e.g., when rendered in a web browser running on the client station 206. In other instances, the conversation interface 220 may be provided through other portals or applications, such as Facebook Messenger™, etc. The conversation interface 220 facilitates a dialog 222 between the prospective client 204 and the virtual agent system 202. The dialog begins when the prospective client 204 uses client station 206 (e.g., a browser running thereon) to navigate to the web site or other portal at which the virtual agent system is instantiated and initiates a chat session with the virtual agent system by responding to a welcome prompt 224 or otherwise providing an input in the form of spoken words or written text through the conversation interface. It should be noted that although only a single prospective client is shown in the illustration, virtual agent system 202 is configured to support multiple concurrent conversations with multiple, independent prospective clients at different client terminals. Further, the virtual agent system may be reachable through multiple different web sites and/or portals, each associated with a different web address.

The illustrated conversation interface 220 in FIG. 2 is intended merely as an example and many variations thereof may be used. In general, the conversation interface provided by the virtual agent system 202 may include one or more graphical images or logos, e.g., associated with the sponsoring law firm or service provider, as well as icons or other graphical elements such as avatars representing the virtual agent system 202, the prospective client, or both. Also, the conversation interface generally includes a field 226 within which the prospective client 204 may type input messages in text form and transmit (or post) the inputs to the virtual agent interface 210 by clicking, pressing, or otherwise engaging an actionable element 228. Alternatively, or in addition, an actionable icon 230 in the form of a microphone may, when selected, activate a voice input instrument (e.g., a microphone) of the client station 206 allowing for voice inputs via the conversation interface 220. Message boxes 230, 232 within the conversation interface 220 represent input messages received from the user 204 through client terminal 206, while message boxes 224, 236 represent responses and other messages provided by the virtual agent system 202 through the virtual agent interface 210. Although shown in serial fashion, with the oldest messages at the top of the conversation interface and the newest messages at the bottom thereof in this illustration, the message boxes may appear in other orders or fashions within the conversation interface 220.

As indicated above, virtual agent system 202 monitors the virtual agent interface 210 for new conversations. For example, when virtual agent system 202 recognizes that a prospective client has navigated to the web site or other portal at which the virtual agent interface 210 is instantiated, a new conversation may be initiated by providing the prompt 224 to the prospective client within the conversation interface 220. If the prospective client responds, a new conversation is recognized, and the virtual agent system engages the prospective client in conversation by means of solicitations such as those in message box 236 to elicit information useful in determining whether the prospective client is suitable for an engagement. In some cases, state bar and/or other regulations may require that chat sessions be initiated only at the direction of a prospective client. Accordingly, the conversation may be initiated by a prospective client signaling an intent to initiate same, for example, by selecting an icon or other screen element to launch a conversation interface or otherwise begin the conversation.

Preferably, the virtual agent system 202 is configured to accept natural language inputs from the prospective client 204. For example, application server 212 or virtual agent interface 210 may include a natural language processor configured to parse input messages such as those in message boxes 224, 236 and extract key words and/or strings (tokens). Fuzzy matching techniques may be employed to identify and/or resolve input strings. For example, in response to an input identifying the occurrence of an accident, the system may be configured to resolve the accident type by posing questions designed to classify the accident as, e.g., a car accident, a slip and fall, etc. This may involve using a recognized string as an index to a dictionary that provides for classification or refinement of the recognized string. Using such a dictionary, recognized strings may trigger follow up questions. For example, an input that is recognized as including the string "broken arm" may trigger questions to uncover whether the break was the result of an accident, e.g., a skiing accident, a product failure, e.g., a ladder collapse, or other event.

The extracted words and/or strings may be used by the predictive case engine 214 to determine potential causes of action associated with the facts being provided by the prospective client. That is, the extracted words and/or strings may be used to interpret the prospective client inputs and classify the prospective client within a relevant taxonomy that allows for further pertinent information to be requested, e.g., by using the extracted key words and/or strings as indices to tables or other data structures that associate causes of action with the key words and/or strings.

By way of example, if during the dialog between the virtual agent system 202 and the prospective client 204 the string "car accident" is identified within an input provided by the prospective client, that string may be recognized by the predictive case engine 214 as being associated with a number of potential causes of action, including negligence. Once so recognized, the predictive case engine 214 may engage the virtual agent interface 210 to begin a question and answer session with the prospective client 204 that seeks to uncover the facts surrounding the car accident that are relevant and useful in scoring the potential negligence cause of action. The questions posed by the predictive case engine may be determined, at least in part, based on information stored in database(s) 216 concerning prior negligence cases in which car accidents were the underlying event. Alternatively, questions posed by the predictive case engine may be relevant to a number of different causes of action and are not necessarily constrained by case type.

Figure 3A:
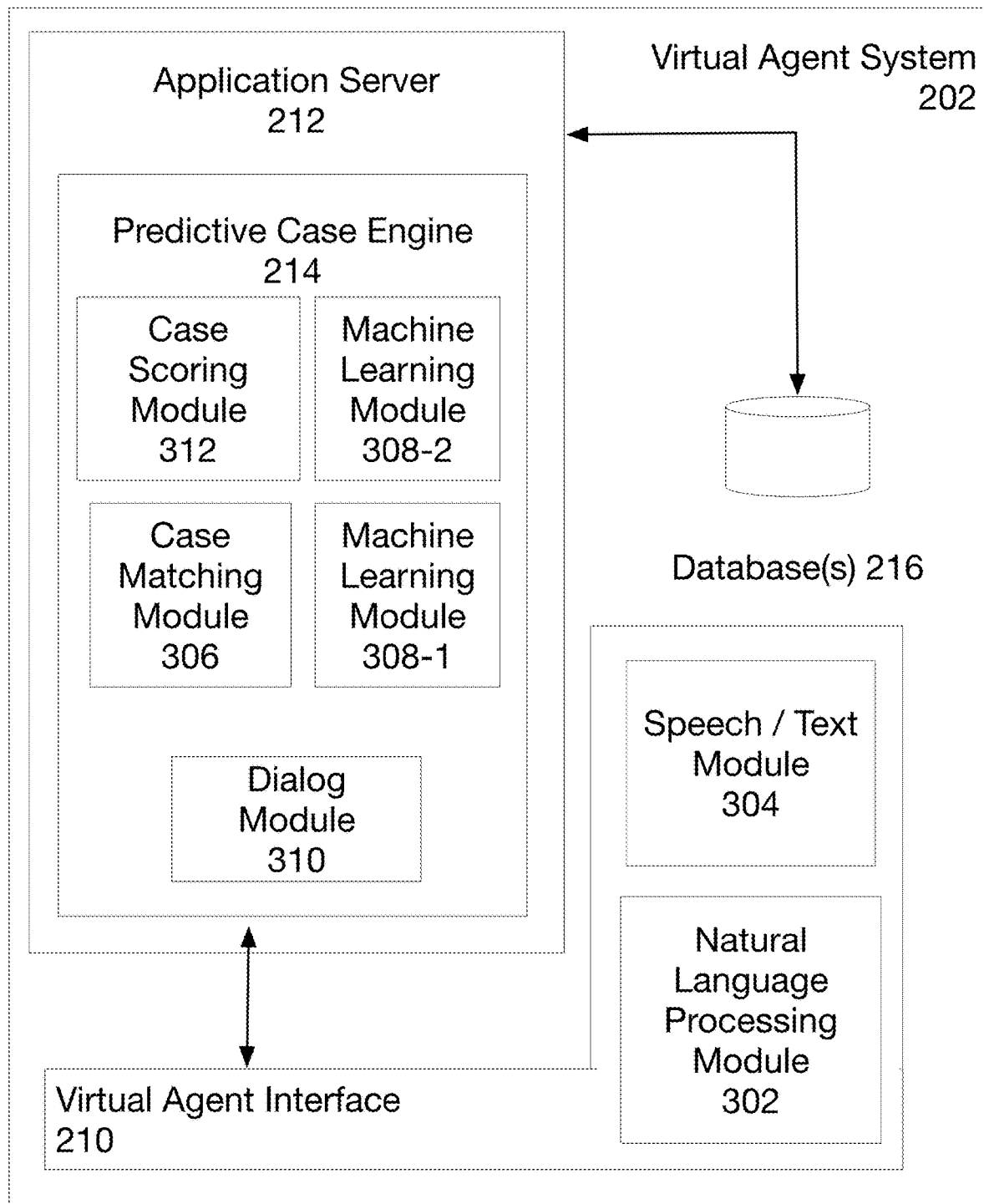
FIG. 3A illustrates further aspects of the virtual agent system shown in FIG. 2 in accordance with embodiments of the present invention.

FIG. 3A provides a more detailed view of the virtual agent system 202. Virtual agent interface 210 includes natural language processing module 302 configured to parse input messages and extract key words and/or strings as discussed above. Also included in virtual agent interface 210 is a speech-to-text conversion module 304, which allows for utterances made by the prospective client to be converted to text for processing by the natural language processing module 302.

The predictive case engine 214 includes a case matching module 306, one or more machine learning modules 308-1, 308-2, etc., and dialog module 310. In one embodiment of the invention dialog module 310 is updated on a per-chat session basis to provide messages to the prospective client through the virtual agent interface 210 according to the activities of the case matching module 306. The case matching module, in turn, is updated through the machine learning module 308-1 according to experiences with prospective client chat sessions as well as new entries in database(s) 216. As shown in the illustrated example, separate machine learning modules may be used for training/updating the case matching module 306 training/updating a case scoring module 312, and/or training/updating a cross-selling module (described below). However, in some implementations, a single machine learning module may be employed.

For example, a machine learning module 308-1 may be configured to train the case matching module 306 to identify potential causes of action from the key words and strings extracted from messages received via the virtual agent interface 210. Informed by prior case information stored in database(s) 216, the machine learning module 308-1 identifies factual distinctions that affect outcomes in different cases. In one embodiment, this may be done using a convolutional neural network to generate case fact pattern vector representations from the prior case information by pooling results of convolution operations on n-dimension vectors that represent extracted facts from individual cases included in the prior case information. The machine learning module 308 then trains the case matching module to engage a prospective client with specific questions when potential causes of action are recognized from strings included in the prospective clients' inputs.

By way of example, through analysis of prior case information concerning car accidents, the machine learning module may train the predictive case engine to recognize that whether the prospective client was a driver or a passenger in a vehicle can be one important fact. Similarly, whether the prospective client was in a vehicle that was struck from behind or was in the vehicle that struck another may be another important fact. Accordingly, the case matching module may be trained to elicit these facts as part of the dialog with the prospective client when the string "car accident" is recognized in one of the prospective client's inputs. To do so, the case management module 306 populates the dialog module 310 with interrogatories to be presented to the prospective client through the virtual agent interface 210, and those interrogatories are played via the conversation interface 220 as a means of gathering this important information. The interrogatories may be fashioned so as to extract the same information through multiple different questions in order to confirm the prospective client's answers remain consistent.

Throughout the dialog with the prospective client, responses from the virtual agent system 202 are generated based on information extracted from the prospective client's input according to training provided by the machine learning module 308-1. As the conversation proceeds, the system evaluates the information obtained from the prospective client to determine if a likely cause of action can be identified. For example, in response to a prospective client's input indicating there was a car accident, the virtual agent system 202 may respond with a question such as "Were you a driver or a passenger?" This response message may be generated based on the machine learning module having trained the case matching module that different considerations surround potential causes of action according to whether or not prospective client was a driver of or a passenger in a vehicle involved in a car accident.

Eventually, based on the information provided by the prospective client, the case matching module 306 may identify a likely cause of action available to the prospective client. Factual information relayed by prospective clients in messages during the dialog with the virtual agent system 202 represent a vector, and the case matching module 306 predicts potential causes of action by looking for minimum vector distances between the strings extracted from the prospective user inputs and those compiled from libraries of reported (and, optionally, unreported) judicial decisions, orders, and other sources. This is essentially a classification task to find instances of the vectors representing the prospective client inputs within those representing the library of prior cases or at least being within a predefined distance thereof.

Any identified likely cause of action is then scored by a case scoring module 312. To score a potential cause of action, the case scoring module evaluates the description provided by the prospective client through the dialog with the virtual agent system 202 against stored case information in database(s) 216. In particular, available verdict and settlement information from prior cases is used as training data for the case scoring module 312, which in some embodiments may be implemented as a convolutional neural network or a recurrent neural network. The training, using prior case outcomes, creates a model that, in effect, predicts the viability and the value, collectively the score, of the identified cause(s) of action associated with the prospective client. By applying the information gleaned from the dialog with the client as inputs to the model, a score is derived. That score can then be assessed against a threshold for the subject cause(s) of action and the outcome of the assessment used as a basis for engaging the prospective client or not.

For example, if the scoring reveals that the prospective client's likely cause of action is suitable for engagement, the system may proceed to present the client with proposed terms of engagement for the sponsoring law firm. The terms may be discussed and explained through the conversation interface and the client provided a letter of engagement or other contract for signature (e.g., via an e-signature platform) during the session. For example, based on results from the predictive case engine analysis, the prospective client may be advised of potential settlement values, potential litigation timelines, and other factors.

If the scoring reveals that the prospective client's likely cause of action is not suitable for engagement, the system continues to engage the prospective client via the conversation interface to obtain additional information that may reveal other potential causes of action and/or additional facts pertaining to the initially identified potential cause of action. As this new information is elicited, the system identifies and evaluates the potential new causes of action and also optionally reassesses previously identified causes of action using the new facts through the scoring and evaluation process described above. The process continues until the prospective client is successfully engaged with respect to one or more causes of action or the client is advised that no such engagement is possible. In this latter instance, the client may be provided a non-engagement letter appropriate to the circumstances.

Figure 3B:
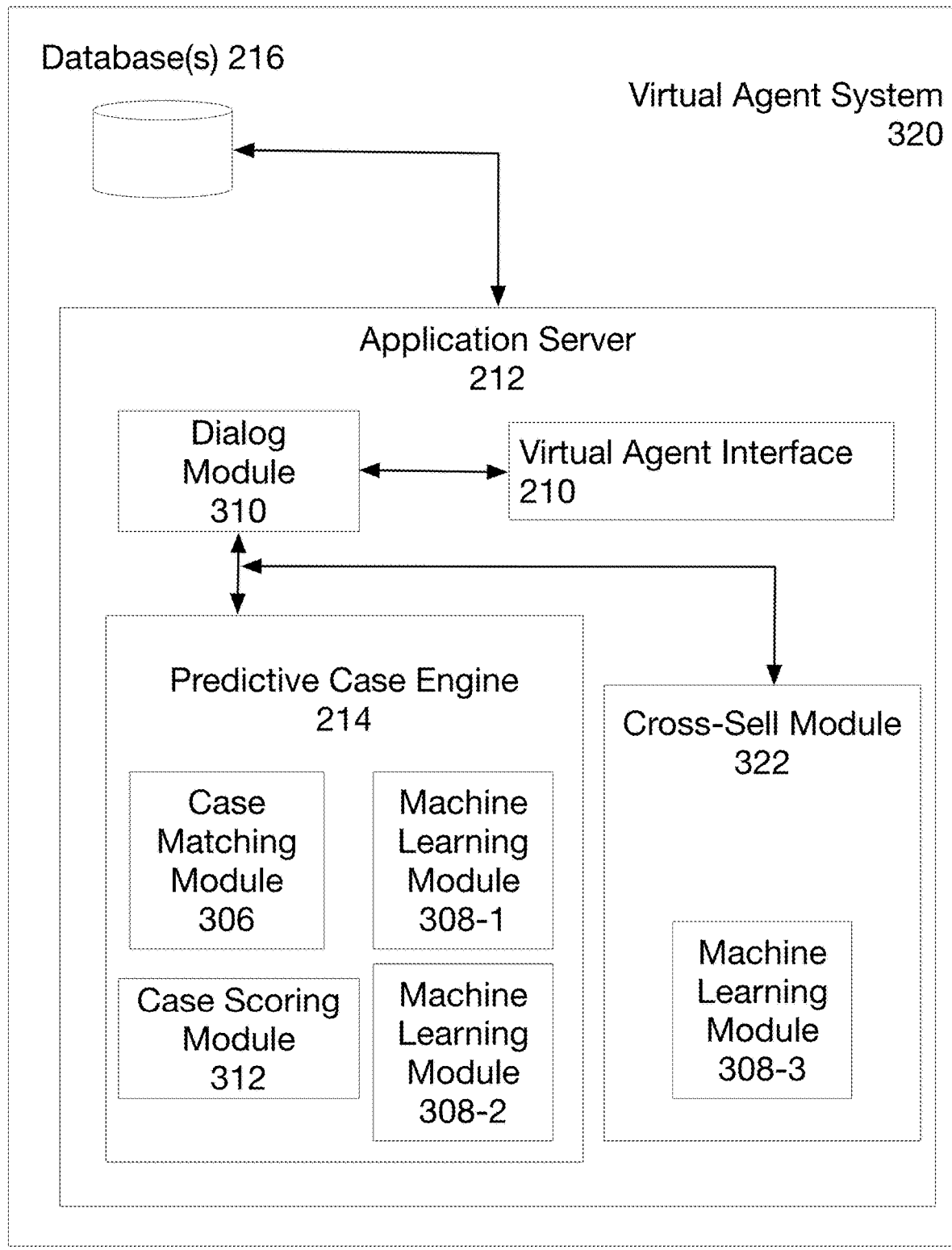
FIG. 3B shows an alternative embodiment of the virtual agent system which includes a separate cross-sell module.

In an alternative embodiment, shown in FIG. 3B, the cross-selling functionality is provided in a separate module 322. As used herein, cross-selling functionality refers to the system's continued engagement with a prospective client in a chat session, even if a previously identified cause of action has not scored sufficiently high to warrant engagement with respect to that cause of action. The cross-selling module 322 monitors the conversation with the prospective client and uses the prospective client's answers or other inputs along with case type(s) identified by the case matching module 306 to identify other potential causes of action for which the prospective client may be eligible. This information is then used to instruct the dialog module 310 in a conversation flow. For example, the cross-selling module may instruct the dialog module to elicit facts concerning potential products liability actions or other causes of action that were first reveled through an interview associated with another case type. To allow for training, the cross-selling module 322 may include a dedicated machine learning module 308-3.

In addition to potential causes of action, the predictive case engine may be used to evaluate (and score) litigation factors such as venue. For example, the predictive case engine may be provided with information concerning judgments, settlements, time to trial, dispositive motion outcomes, etc. Using this information, where available, the predictive case engine may provide to the prospective client (and/or attorneys to which the client may be referred) ranked venue options for a litigation.

The above description makes use of block diagrams and flowchart illustrations of methods and systems embodying the present invention. These illustrated blocks and processes may be implemented by one or more programmed computer systems in which machine-executed instructions cause a device to implement the functions specified in the flowchart block or blocks. Other means for implementing the functions including various combinations of hardware, firmware and software as described herein may also be employed. For example, the term "module" as used herein refers to a functional unit composed of hardware (e.g., a processor-based system such as that described with reference to FIG. 4, below, or similar unit) and software (e.g., instructions executed by such a processor) that performs the identified functions. Such modules are typically self-contained units of the larger systems in which they are embodied, however, the processor components thereof may be shared among multiple modules. Alternatively, the functions ascribed to modules herein may be implemented as services that are called as required. The services may be implemented on one or more servers at one or ore locations.

Figure 4:
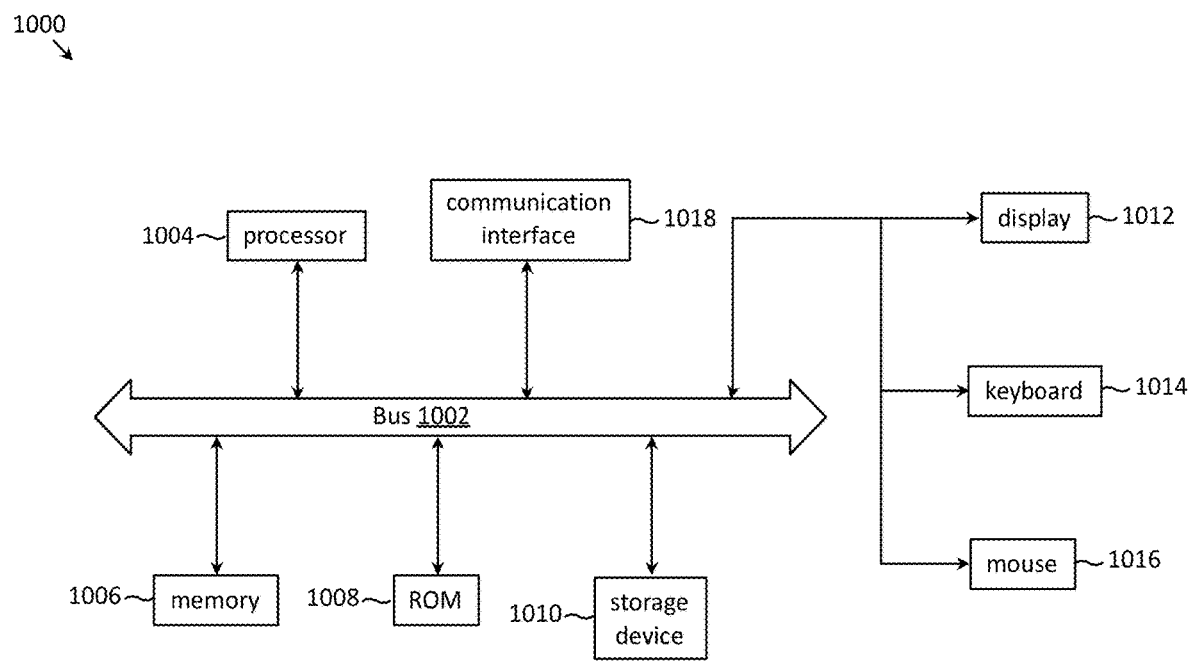
FIG. 4 illustrates an example of a processor-based system representative of computing systems such as a client terminal and/or server of the virtual agent system shown in FIGS. 1-3B.

FIG. 4 provides an example of a system 1000 that may be representative of any of the computing systems (e.g., client terminal 206, server 212, etc.) discussed herein. Examples of system 1000 may include a smartphone, a desktop, laptop, notebook, or other computer, etc. Note, not all of the various computer systems have all of the features of system 1000. For example, certain ones of the computer systems discussed above may not include a display inasmuch as the display function may be provided by a client computer communicatively coupled to the computer system or a display function may be unnecessary. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs and the like).

Computer system 1000 may be coupled via the bus 1002 to a display 1012, such as a flat panel display, for displaying information to a computer user. An input device 1014, such as a keyboard including alphanumeric and other keys, may be coupled to the bus 1002 for communicating information and command selections to the processor 1004. Another type of user input device is cursor control device 1016, such as a mouse, a trackpad, or similar input device for communicating direction information and command selections to processor 1004 and for controlling cursor movement on the display 1012. Other user interface devices, such as microphones, speakers, etc. are not shown in detail but may be involved with the receipt of user input and/or presentation of output.

The processes referred to herein may be implemented by processor 1004 executing appropriate sequences of computer-readable instructions contained in main memory 1006. Such instructions may be read into main memory 1006 from another computer-readable medium, such as storage device 1010, and execution of the sequences of instructions contained in the main memory 1006 causes the processor 1004 to perform the associated actions. In alternative embodiments, hard-wired circuitry or firmware-controlled processing units may be used in place of or in combination with processor 1004 and its associated computer software instructions to implement the invention. The computer-readable instructions may be rendered in any computer language.

Computer system 1000 also includes a communication interface 1018 coupled to the bus 1002. Communication interface 1018 may provide a two-way data communication channel with a computer network, which provides connectivity to and among the various computer systems discussed above. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1000 can send and receive messages and data through the communication interface 1018 and in that way communicate with hosts accessible via the Internet. It is noted that the components of system 1000 may be located in a single device or located in a plurality of physically and/or geographically distributed devices.

What is claimed is:

1. A system for automatically interviewing and evaluating prospective clients for engagement with a law firm, the system comprising:

a virtual agent interface coupled via a network interface to be accessible to prospective clients of a law firm, wherein the virtual agent interface includes a natural language processor configured to parse input messages received from the prospective clients via natural language inputs and to extract key words and/or strings from said natural language inputs; and a server running a predictive case engine, said predictive case engine communicatively coupled to the virtual agent interface to receive the key words and/or strings extracted from the input messages by the virtual agent interface, and to present interrogatories to the prospective clients via the virtual agent interface, the virtual agent interface thus configured as a front end for the predictive case engine to engage the prospective clients of the law firm in a conversation to elicit facts concerning potential causes of action, wherein the predictive case engine comprises:

a case matching module configured to:
identify potential causes of action from the key words and/or strings extracted by the virtual agent interface by using said key words and/or strings as indices to data structures that associate causes of action with the key words and/or strings, and
upon identifying a specific potential cause of action, engage the prospective clients in a virtual conversation via the virtual agent interface to elicit facts concerning the specific potential cause of action; and one or more machine learning modules configured to:
identify factual distinctions associated with the potential causes of action that affect outcomes in judicial decisions and settlements by accessing one or more databases storing prior case information, and generate, using a convolutional neural network, case fact pattern vector representations from the prior case information by pooling results of convolution operations on n-dimension vectors that represent extracted facts from individual cases included in the prior case information, and
use identified factual distinctions to train the case matching module to engage the prospective clients with specific questions when the potential causes of action are recognized from the key words and/or strings extracted from the input messages, a case scoring module to score the potential causes of action by evaluating descriptions provided by the prospective clients through the virtual conversation against stored case information in the one or more databases, each respective evaluation producing an outcome with an associated confidence level and those outcomes rising above a predetermined threshold being deemed to be an engageable prospect, said predictive case engine thus configured to evaluate said facts for assessing engagement of the prospective clients by the law firm using scorings assigned according to stored information concerning prior judicial decisions and settlements.

2. The system according to claim 1, wherein the case matching module is configured to engage the prospective clients with the specific questions by populating a dialog module of the predictive case engine with the interrogatories to be presented to the prospective clients through the virtual agent interface.

3. The system according to claim 1, wherein the stored case information comprises available verdict and settlement information from prior cases.

* * * * *